(12) United States Patent
Li et al.

(10) Patent No.: US 8,711,159 B2
(45) Date of Patent: Apr. 29, 2014

(54) VGPU: A REAL TIME GPU EMULATOR

(75) Inventors: Jinyu Li, Redmond, WA (US); Chen Li, Redmond, WA (US); Gang Chen, Beijing (CN); Xin Tong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1029 days.

(21) Appl. No.: 12/391,066

(22) Filed: Feb. 23, 2009

(65) Prior Publication Data
US 2010/0214301 A1    Aug. 26, 2010

(51) Int. Cl.
G06T 1/00    (2006.01)

(52) U.S. Cl.
USPC .......................................... 345/522; 345/557

(58) Field of Classification Search
None
See application file for complete search history.

(56) References Cited

U.S. PATENT DOCUMENTS

| | | | |
|---|---|---|---|
| 6,731,288 B2 | 5/2004 | Parsons et al. | |
| 6,937,246 B2 | 8/2005 | Munshi et al. | |
| 6,947,049 B2 | 9/2005 | Spitzer et al. | |
| 6,975,325 B2 | 12/2005 | Morein et al. | |
| 7,174,436 B1 | 2/2007 | Langendorf et al. | |
| 7,219,085 B2 | 5/2007 | Buck et al. | |
| 7,245,302 B1 * | 7/2007 | Donham et al. | 345/519 |
| 7,385,608 B1 | 6/2008 | Baldwin | |
| 7,447,997 B2 | 11/2008 | Colle | |
| 7,466,314 B2 | 12/2008 | Loop et al. | |
| 7,817,154 B1 * | 10/2010 | Sams et al. | 345/501 |
| 8,001,531 B1 * | 8/2011 | Rideout et al. | 717/124 |
| 8,006,232 B1 * | 8/2011 | Rideout et al. | 717/124 |
| 2003/0076722 A1 | 4/2003 | Solomon | |
| 2005/0235287 A1 | 10/2005 | Harper | |
| 2006/0039468 A1 | 2/2006 | Emerson et al. | |
| 2006/0170680 A1 * | 8/2006 | Peeper et al. | 345/426 |
| 2007/0006178 A1 * | 1/2007 | Tan | 717/136 |
| 2007/0091104 A1 | 4/2007 | Singh et al. | |
| 2007/0260446 A1 | 11/2007 | Suba et al. | |
| 2007/0283158 A1 | 12/2007 | Danseglio | |
| 2008/0024490 A1 | 1/2008 | Loop et al. | |

(Continued)

OTHER PUBLICATIONS

Office Action for U.S. Appl. No. 12/361,216, mailed on Oct. 18, 2011, Chen Li, "Content Based Cache for Graphics Resource Management", 23 pgs.

(Continued)

*Primary Examiner* — Kee M Tung
*Assistant Examiner* — Michelle Chin
(74) *Attorney, Agent, or Firm* — Carole Boelitz; Micky Minhas; Lee & Hayes, PLLC (57) ABSTRACT

An exemplary method for emulating a graphics processing unit (GPU) includes executing a graphics application on a host computing system to generate commands for a target GPU wherein the host computing system includes host system memory and a different, host GPU; converting the generated commands into intermediate commands; based on one or more generated commands that call for one or more shaders, caching one or more corresponding shaders in a shader cache in the host system memory; based on one or more generated commands that call for one or more resources, caching one or more corresponding resources in a resource cache in the host system memory; based on the intermediate commands, outputting commands for the host GPU; and based on the output commands for the host GPU, rendering graphics using the host GPU where output commands that call for one or more shaders access the one or more corresponding shaders in the shader cache and where output commands that call for one or more resources access the one or more corresponding resources in the resource cache. Other methods, devices and systems are also disclosed.

22 Claims, 9 Drawing Sheets

(56) References Cited

U.S. PATENT DOCUMENTS

| | | |
|---|---|---|
| 2008/0140380 A1 | 6/2008 | Marsyla et al. |
| 2008/0204473 A1 | 8/2008 | Jackson |
| 2008/0218527 A1 | 9/2008 | Romanick |
| 2009/0051687 A1* | 2/2009 | Kato et al. ............... 345/426 |
| 2009/0109219 A1 | 4/2009 | DeCoro et al. |
| 2009/0110295 A1 | 4/2009 | Ogaki et al. |
| 2009/0164205 A1* | 6/2009 | Sargaison ............... 703/26 |
| 2010/0013842 A1 | 1/2010 | Green et al. |
| 2010/0110083 A1* | 5/2010 | Paltashev et al. ......... 345/506 |
| 2011/0173476 A1 | 7/2011 | Reed |

OTHER PUBLICATIONS

Botelho et al., "Perfect Hashing for Data Management Applications", arXiv:cs/0702159v1[cs.DS], Feb. 2007, 12 pages.

Office Action for U.S. Appl. No. 12/361,216, mailed on Feb. 13, 2012, Chen Li, "Content Based Cache for Graphics Resource Management", 27 pgs.

Office action for U.S. Appl. No. 12/361,216, mailed on Jul. 27, 2012, Li et al., "Content Based Cache for Graphics Resource Management", 29 pages.

Wikipedia, "Hash function", retrieved on Dec. 3, 2007 at <<http://en.wikipedia.org/wiki/Hash_function>>, Wikimedia Foundation, Inc., Feb. 2007, 5 pages.

Office action for U.S. Appl. No. 12/361,216, mailed on Mar. 8, 2013, Li et al., "Content Based Cache for Graphics Resource Management", 30 pages.

Office action for U.S. Appl. No. 12/361,216, mailed on Oct. 9, 2013, Li, et al., "Content Based Cache for Graphics Resource Management", 36 pages.

Office action for U.S. Appl. No. 12/361,216, mailed on Jul. 3, 2013, Li et al, "Content Based Cache for Graphics Resource Management", 32 pages.

\* cited by examiner

VGPU: A REAL TIME GPU EMULATOR

RELATED APPLICATIONS

This application is related to a U.S. Patent Application entitled "Content based cache for graphics resource management", having Ser. No. 12/361,216, filed on Jan. 28, 2009, which is hereby incorporated by reference.

BACKGROUND

A Graphics Processing Unit (GPU) provides special features for graphics rendering tasks on a computing device (e.g., a PC, a game console, etc.). Various types of GPUs exist and these types often vary in hardware architecture, functionalities and performance. These differences can complicate development of graphics applications as a developer typically wants a graphics application to produce the same rendering results in about the same amount of time regardless of the GPU used.

To assess rendering results and performance, a developer normally "ports" an application from one platform to another to test different GPUs and even different CPUs or CPU-GPU combinations. When an application is expected to perform on many types of GPU, porting can be a time consuming process. Various exemplary techniques described herein allow for real time emulation of a target GPU and can be used to assess results and performance of a graphics application without physically porting the application to a computing platform with the actual target GPU.

SUMMARY

An exemplary method for emulating a graphics processing unit (GPU) includes executing a graphics application on a host computing system to generate commands for a target GPU where the host computing system includes host system memory and a different, host GPU; converting the generated commands into intermediate commands; based on one or more generated commands that call for one or more shaders, caching one or more corresponding shaders in a shader cache in the host system memory; based on one or more generated commands that call for one or more resources, caching one or more corresponding resources in a resource cache in the host system memory; based on the intermediate commands, outputting commands for the host GPU; and based on the output commands for the host GPU, rendering graphics using the host GPU where output commands that call for one or more shaders access the one or more corresponding shaders in the shader cache and where output commands that call for one or more resources access the one or more corresponding resources in the resource cache. Other methods, devices and systems are also disclosed.

DESCRIPTION OF DRAWINGS

Non-limiting and non-exhaustive examples are described with reference to the following figures.

DETAILED DESCRIPTION

Overview

An exemplary GPU emulation framework, referred to as a virtual GPU (VGPU), can emulate functionality of a specific, target GPU on a computing platform that has a different GPU. As explained, the VGPU can emulate a target graphics subsystem at the binary level to provide for portability and compatibility testing with real time performance. When compared to API level porting or emulation, the exemplary VGPU approach operates without requiring any special porting work from a graphics application developer.

An exemplary VGPU system emulates target or "guest" graphics commands using a host CPU and a host GPU. The VGPU's inputs are groups of low level graphics commands generated by a host CPU or guest CPU at run-time. For example, a guest CPU can be emulated using a guest CPU just-in-time (JIT) emulator executing on the host CPU at run-time. Whether from a host CPU or a guest CPU, the VGPU parses emitted graphics commands and converts them to intermediate representations. In essentially concurrent operation, the shader and other graphics resources (e.g., vertex and texture data) are loaded and converted from guest GPU formats to host GPU formats. The graphics resources and shaders are correctly linked and packed in a commands stream for the host GPU. The VGPU executes intermediate representations (e.g., graphics commands) in the form of host graphics commands on the host platform (e.g., using the host GPU and/or the host CPU).

The real time performance of the VGPU is achieved mainly by two caches, one for shaders and one for graphics resources. The two caches store various graphics resources that can reused, to avoid time consuming shader compilation and resource conversion. By efficiently utilizing the host CPU and the host GPU, the VGPU can achieve real time performance with reasonable memory overhead.

Figure 1:
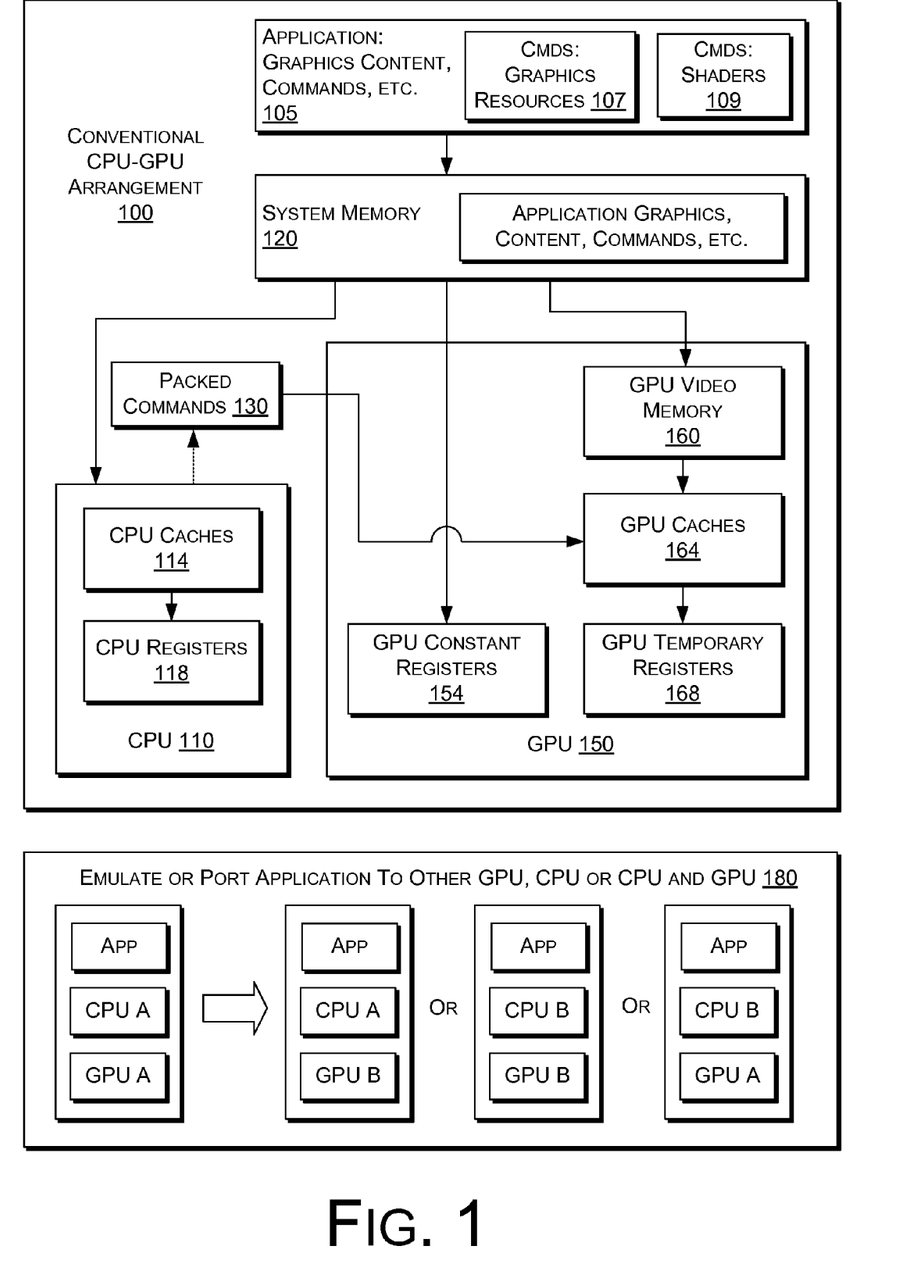
FIG. 1 is a block diagram of a conventional CPU-GPU arrangement along with examples of porting.

FIG. 1 shows a conventional CPU-GPU arrangement of a computing device 100 that includes an application 105, a CPU 110, system memory 120 and a GPU 150 along with some porting examples 180. In FIG. 1, the CPU 110 includes CPU caches 114 and CPU registers 118. As illustrated, the GPU 150, like the CPU 110, has its own caches and registers to accelerate data access during computation. In a so-called GPU memory model, the GPU 150 has a memory hierarchy that includes video memory 160, caches 164, constant registers 154 and temporary registers 168. In the example of FIG. 1, the memory system of the GPU 150 may be viewed as a branch in the overall memory hierarchy of the underlying computing device.

Given the arrangement of FIG. 1, when the application 105 executes on the CPU 110, it generates low level graphics commands and transmits them in one or more packed command buffers 130 to the GPU 150. At essentially the same time, the application code also creates or loads the graphics resources (e.g., per commands 107) and shaders (e.g., per commands 109) into memory of the GPU 150. The GPU 150 parses the command buffers, loads the graphics data and then performs the corresponding rendering tasks.

With respect to the porting examples 180, a developer or equipment manufacturer may wish to assess rendering results and performance of an application using various hardware. The examples 180 show an application on a platform with CPU A and GPU A being ported to a platform with CPU A and GPU B, a platform with CPU B and GPU B and a platform with CPU B and GPU A. Techniques described herein can perform any of these porting examples using a platform such as CPU A and GPU A, which is referred to as the host platform. Where an exemplary VGPU framework is used, the target CPU or target GPU are referred to as a guest CPU or a guest GPU, respectively. As discussed herein, the exemplary VGPU framework executes on a host CPU using memory resources of the host platform to ultimately render graphics using a host GPU where the VGPU framework emulates a guest CPU, a guest GPU or a guest CPU and guest GPU. In various examples, the VGPU is shown for emulating a guest GPU while a component of the VGPU framework is shown for emulating a guest CPU (e.g., a just-in-time component or "jitter").

With respect to emulation, the arrangement of FIG. 1 poses several challenges. First, in a conventional system, all the hardware graphics features can be exposed to a developer (e.g., as on game console). In other words, a game developer can directly access hardware. Second, as GPU command buffers are generated at run-time, it is hard to retrieve the command buffers by static pre-parsing approaches. Given such conditions, a pre-compilation to GPU emulation is not practical.

While FIG. 1 shows one conventional arrangement, others exist. Further, architecture of guest graphics system and host graphics system can be different. For example, the XBOX360® and XBOX® (Microsoft Corporation, Redmond, Wash.) use a unified memory architecture where a CPU and a GPU share the same memory. In contrast, most PC systems use non-UMA architecture, where graphics resources need to be copied from main system memory to GPU memory. These architectural aspects can be accounted for by resource management in an exemplary VGPU framework.

Figure 2:
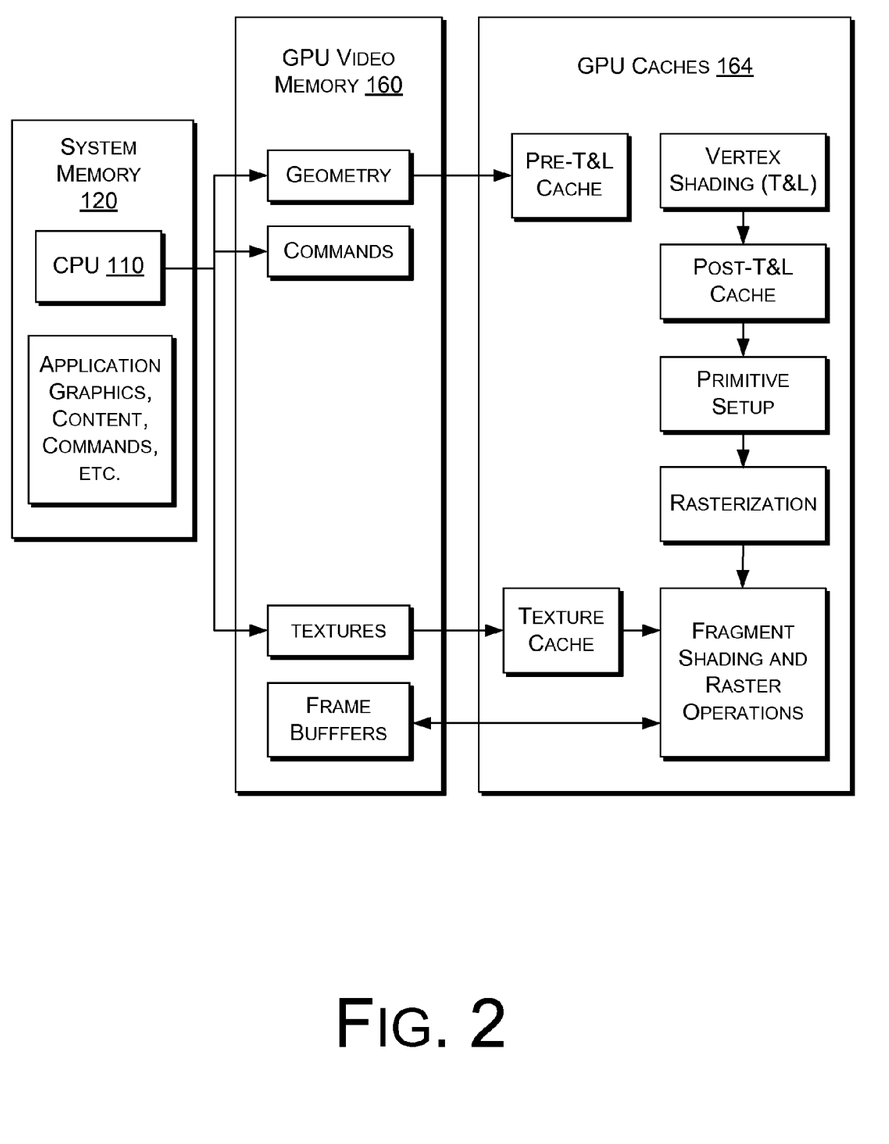
FIG. 2 is a block diagram of a conventional CPU-GPU arrangement that illustrates some memory requirements and related procedures.

FIG. 2 shows additional details of the memory 160 and caches 164 of the GPU 150 along with the CPU 110 of FIG. 1. FIG. 2 pertains to a heterogeneous multiprocessor system (e.g., a CPU and a GPU) where a processing pipeline operates only as fast as its slowest stage. The processing pipeline, at a high level, can be categorized into a CPU part and a GPU part. Within the GPU part a number of functional units operate in parallel, which essentially act as separate special-purpose processors. Bottlenecks in the GPU part can occur in vertex and index fetching, vertex shading (transform and lighting, or T&L), fragment shading, and raster operations (ROP).

A general goal of any type of rendering is to minimize or avoid bottlenecks. However, if such bottlenecks are specific to a particular GPU, emulation should capture them. In emulation, techniques should not compound or inadvertently create bottlenecks that may exist for a target GPU. As described herein, via appropriate memory techniques, an exemplary VGPU also aims to minimize or avoid bottlenecks that would not exist but for the VGPU.

With respect to the CPU part, many applications are CPU bound, for example, due to complex physics or AI, and sometimes because of poor batching or resource management. The purpose of CPU porting (see, e.g., porting examples 180 of FIG. 1) is to test rendering results and performance of an application on a different CPU. An exemplary VGPU framework does not aim to optimize a guest CPU but rather maintain its pros and cons while executing a graphics application. Hence, for proper assessment, issues that may exist in communication (e.g., commands, content, etc.) between a guest CPU and a GPU should be maintained during emulation of the guest CPU.

Figure 3:
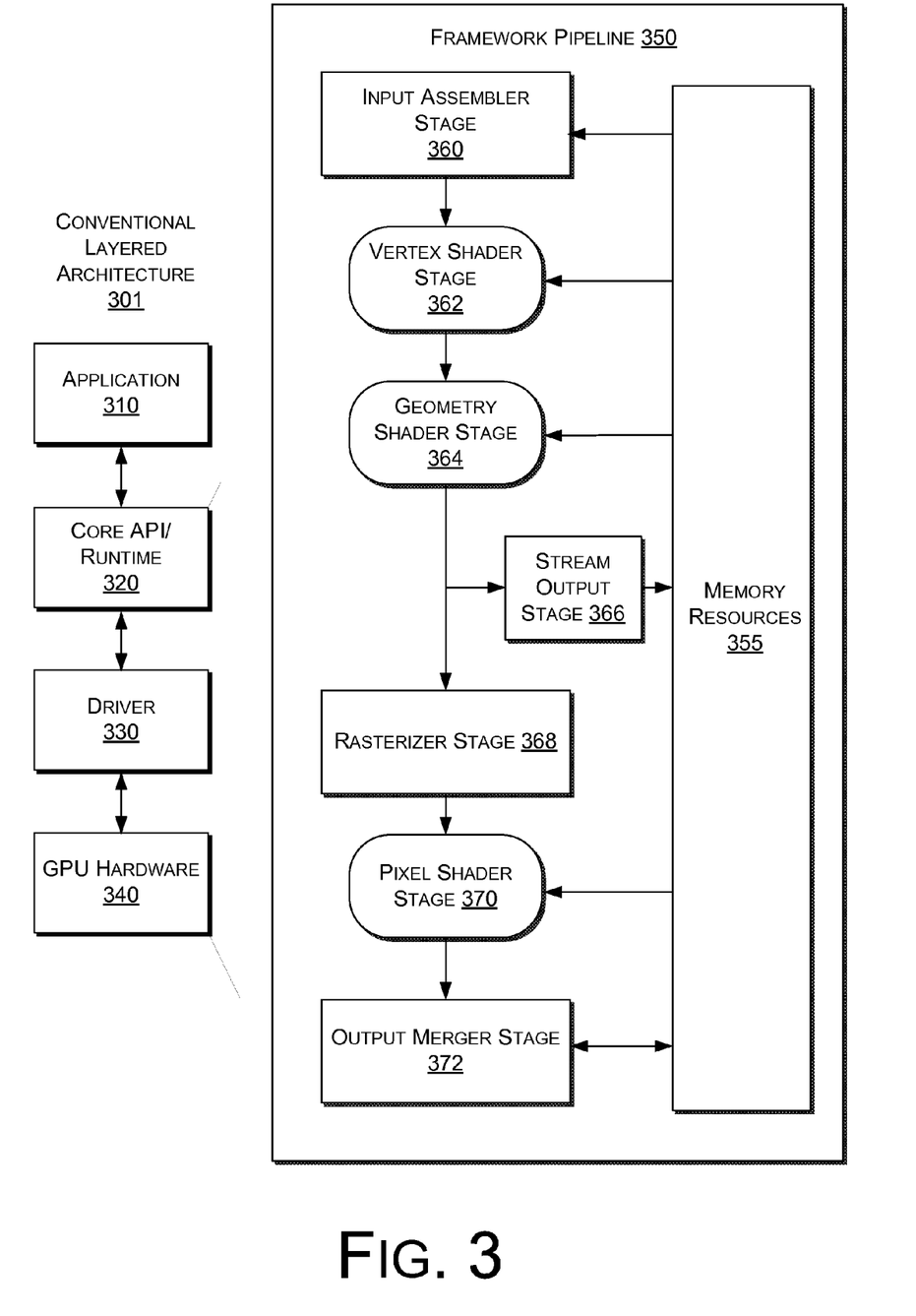
FIG. 3 is a block diagram of a conventional layered architecture for graphics rendering that relies, at least in part, on an application programming interface (API) framework that exposes GPU functionality.

FIG. 3 shows a conventional layered architecture 301 and a pipeline 350. The architecture 301 includes an application 310, an API/runtime 320, a driver 430 and GPU hardware 340. The API and runtime 320 serve as a low-overhead, thin abstraction layer above the GPU hardware 340 and provide services for allocating and modifying resources, creating views and binding them to different parts of the pipeline 350, creating shaders and binding them to the pipeline 350, manipulating state for the non-programmable parts of the pipeline 350, initiating rendering operations, and querying information from the pipeline 350 either by retrieving statistics or the contents of resources.

In FIG. 3, the API/runtime layer 320 provides a relatively uniform manner to expose certain GPU functionality. However, it does not "emulate" a GPU but rather abstracts functionality that may be available on various GPUs.

In the architecture 301, commands are delivered to the pipeline 350 via a memory buffer in which it is possible to append commands. Commands are either of two classes: those that allocate or free resources and those that alter pipeline state. Accordingly, each API command calls through the runtime to the driver 330 to add hardware-specific translation of the command to the buffer. The buffer is transmitted to the GPU hardware 340 when it is full or when another operation requires the rendering state to be synchronized (e.g., reading the contents of a render target).

In the example of FIG. 3, the pipeline 350 corresponds to that of the Direct3D®10 framework (e.g., Direct3D® API/runtime) (Microsoft Corporation, Redmond, Wash.). In the Direct3D®10 framework, a user may create programmable shaders for the pipeline using the High Level Shading Language (HLSL). HLSL is to the Direct3D® framework as the GLSL shading language is to the OpenGL® framework (Silicon Graphics, Inc., Mountain View, Calif.). Further, HLSL shares aspects of the NVIDIA® Cg shading language (NVidia Corporation, Fremont, Calif.).

In general, the stages of the framework pipeline 350 can be configured using the Direct3D® API. Stages featuring common shader cores (the rounded rectangular blocks 362, 364 and 370) are programmable using the HLSL programming language, which makes the pipeline 350 flexible and adaptable. HLSL shaders can be compiled at author-time or at runtime, and set at runtime into the appropriate pipeline stage. In general, to use a shader, a process compiles the shader, creates a corresponding shader object, and sets the shader object for use. The purpose of each of the stages is listed below.

Input-Assembler Stage 360—The input-assembler stage 360 is responsible for supplying data (triangles, lines and points) to the pipeline 350.

Vertex-Shader Stage 362—The vertex-shader stage 362 processes vertices, typically performing operations such as transformations, skinning, and lighting. A vertex shader takes a single input vertex and produces a single output vertex.

Geometry-Shader Stage 364—Conventionally, the geometry-shader stage 364 processes entire primitives where its input is a full primitive (which is three vertices for a triangle, two vertices for a line, or a single vertex for a point). In addition, each primitive can also include the vertex data for any edge-adjacent primitives, which may include at most an additional three vertices for a triangle or an additional two vertices for a line. The geometry shader stage 364 also supports limited geometry amplification and de-amplification. Given an input primitive, the geometry shader stage 364 can discard the primitive, or emit one or more new primitives.

Stream-Output Stage 366—The stream-output stage 366 is designed for streaming primitive data from the pipeline to memory on its way to a rasterizer. Data can be streamed out and/or passed into a rasterizer. Data streamed out to memory 355 can be recirculated back into the pipeline 350 (e.g., as input data or read-back from a CPU).

Rasterizer Stage 368—The rasterizer stage 368 is responsible for clipping primitives, preparing primitives for the pixel shader and determining how to invoke pixel shaders.

Pixel-Shader Stage 370—The pixel-shader stage 370 receives interpolated data for a primitive and generates per-pixel data such as color.

Output-Merger Stage 372—The output-merger stage 372 is responsible for combining various types of output data (pixel shader values, depth and stencil information) with the contents of the render target and depth/stencil buffers to generate the final pipeline result.

Conventionally, at a very high level, data enter the graphics pipeline 350 as a stream of primitives that are processed by up to as many as three of the shader stages:

The vertex shader stage 362 performs per-vertex processing such as transformations, skinning, vertex displacement, and calculating per-vertex material attributes. Conventionally, tessellation of higher-order primitives should be done before the vertex shader stage 362 executes. As a minimum, a vertex shader stage 362 must output vertex position in homogeneous clip space. Optionally, the vertex shader stage 362 can output texture coordinates, vertex color, vertex lighting, fog factors, and so on.

Conventionally, the geometry shader stage 364 performs per-primitive processing such as material selection and silhouette-edge detection, and can generate new primitives for point sprite expansion, fin generation, shadow volume extrusion, and single pass rendering to multiple faces of a cube texture.

The pixel shader stage 370 performs per-pixel processing such as texture blending, lighting model computation, and per-pixel normal and/or environmental mapping. Pixel shaders of the pixel shader stage 370 work in concert with vertex shaders of the vertex shader stage 362; conventionally, the output of the vertex shader stage 362 provides the inputs for the pixel shader stage 370.

In addition to allowing access to whole primitives, the geometry shader stage 364 can create new primitives on the fly. Specifically, the geometry shader in Direct3D®10 can read in a single primitive (with optional edge-adjacent primitives) and emit zero, one, or multiple primitives. As shown in the pipeline of FIG. 3, the output from the geometry shader stage 364 may be fed to the rasterizer stage 368 and/or to a vertex buffer in memory 355 via the stream output stage 366. Output fed to memory 355 can be expanded to individual point/line/triangle lists (e.g., in a manner as they would be passed to the rasterizer stage 368).

The geometry shader stage 364 outputs data one vertex at a time by appending vertices to an output stream object of the stream output stage 366. The topology of the streams is typically determined by a fixed declaration, choosing one of: PointStream, LineStream, or TriangleStream as the output for the geometry shader stage 364. In Direct3D®10, there are three types of stream objects available, PointStream, LineStream and TriangleStream which are all templated objects. The topology of the output is determined by their respective object type, while the format of the vertices appended to the stream is determined by the template type. Execution of a geometry shader instance is atomic from other invocations, except that data added to the streams is serial. The outputs of a given invocation of a geometry shader of the geometry shader stage 364 are independent of other invocations (though ordering is respected). Conventionally, a geometry shader generating triangle strips will start a new strip on every invocation.

Figure 4:
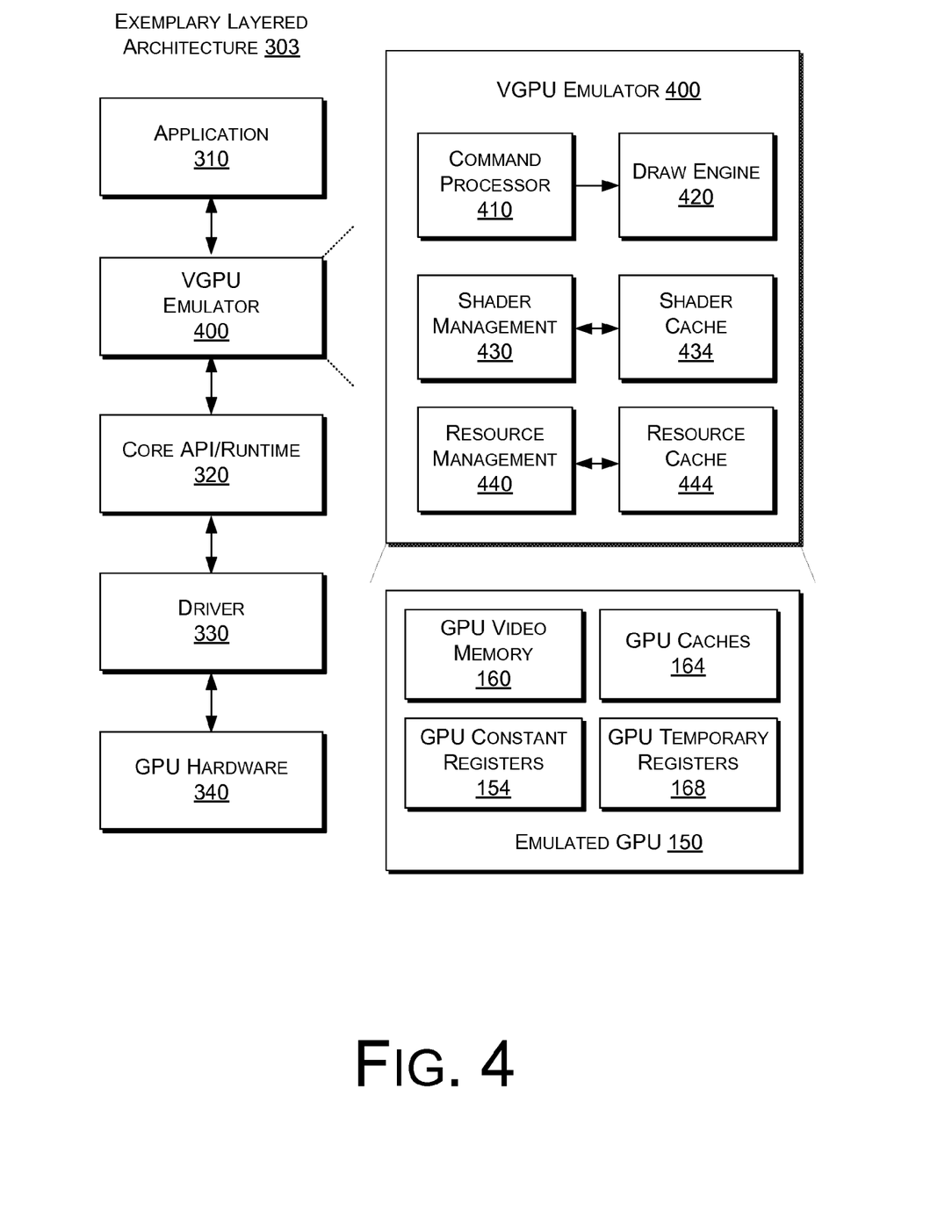
FIG. 4 is a block diagram of an exemplary layered architecture for graphics rendering that includes a virtual graphics processing unit (VGPU) that can emulate a target GPU.

FIG. 4 shows an exemplary layered architecture 303 that includes a VGPU emulator 400 to emulate a GPU (see, e.g., the GPU 150). In this example, the pipeline 350 of FIG. 3 may exist relatively unaltered. In other words, the VGPU emulator 400 emulates a guest GPU (e.g., GPU 150) and relies on the API/runtime layer 320 to control the host GPU. In this manner, the VGPU emulator 400 can effectively emulate one or more types of guest GPUs substantially independent of the underlying host GPU. The API/runtime layer 320 abstracts and exposes host GPU functionality while, as described herein, the emulator 400 emulates hardware and logic specific aspects of a guest GPU. After processing by the emulator 400, how a rendering result is obtained is not of great concern as long as it is accomplished expeditiously without introducing artifacts that could be attributed to the emulated, guest GPU. The API/runtime layer 320 suitably accomplishes the task based on commands issued by the emulator 400 and by providing memory structures readily accessible by the host GPU.

The VGPU emulator 400 includes a command processor 410, a draw engine 420, a shader management module 430 that manages a shader cache 434, and a resource management module 440 that manages a resource cache 444. The VGPU emulator 400 is typically present as a framework on a host computing device for execution on a host CPU. As described herein, the VGPU emulator 400 may be invoked as desired to emulate a guest GPU. As mentioned, in general, the VGPU framework includes one or more components for emulating a guest CPU. Hence, an exemplary VPGU framework can emulate the various porting examples 180 of FIG. 1.

The VGPU emulator 400 emulates a GPU at the binary level. The inputs of VGPU are the low level command buffers, shaders and graphics resources generated by the application 310 code at run-time. In this particular example, to allow the VGPU emulator 400 to operate on different hardware, the host-side GPU graphics command execution can be handled using the Direct3D® API/runtime 320; noting that OpenGL® or other framework may be used to achieve some degree of hardware agnostics. In other words, that although the Direct3D® interface is referred to for VGPU to host GPU rendering tasks, the exemplary design is flexible and may use other host execution solutions, such as OpenGL®, host GPU direct low level graphics commands execution, or even software rendering using a host CPU. In such examples, the architecture 303 would differ accordingly at the API/runtime layer 320.

In the VGPU emulator 400, the command processor 410 parses low level graphics commands and generates intermediate VGPU commands. The draw engine 420 receives the intermediate VGPU commands and then generates the resulting host Direct3D® calls, which are used to drive the host GPU for rendering. The draw engine 420 also drives resource management 430 and shader management 440 to translate a guest GPU graphics data to host Direct3D® resource and shaders. Logic for the VGPU emulator 400 generally runs on a host CPU. As discussed herein, careful design and implementation are keys to VGPU performance as run-time resource conversion and creation are expensive tasks.

The exemplary VGPU emulator 400 of FIG. 4 maintains the original interface between a CPU and a guest GPU where all graphics features can be supported host side without awareness from guest side.

Figure 5:
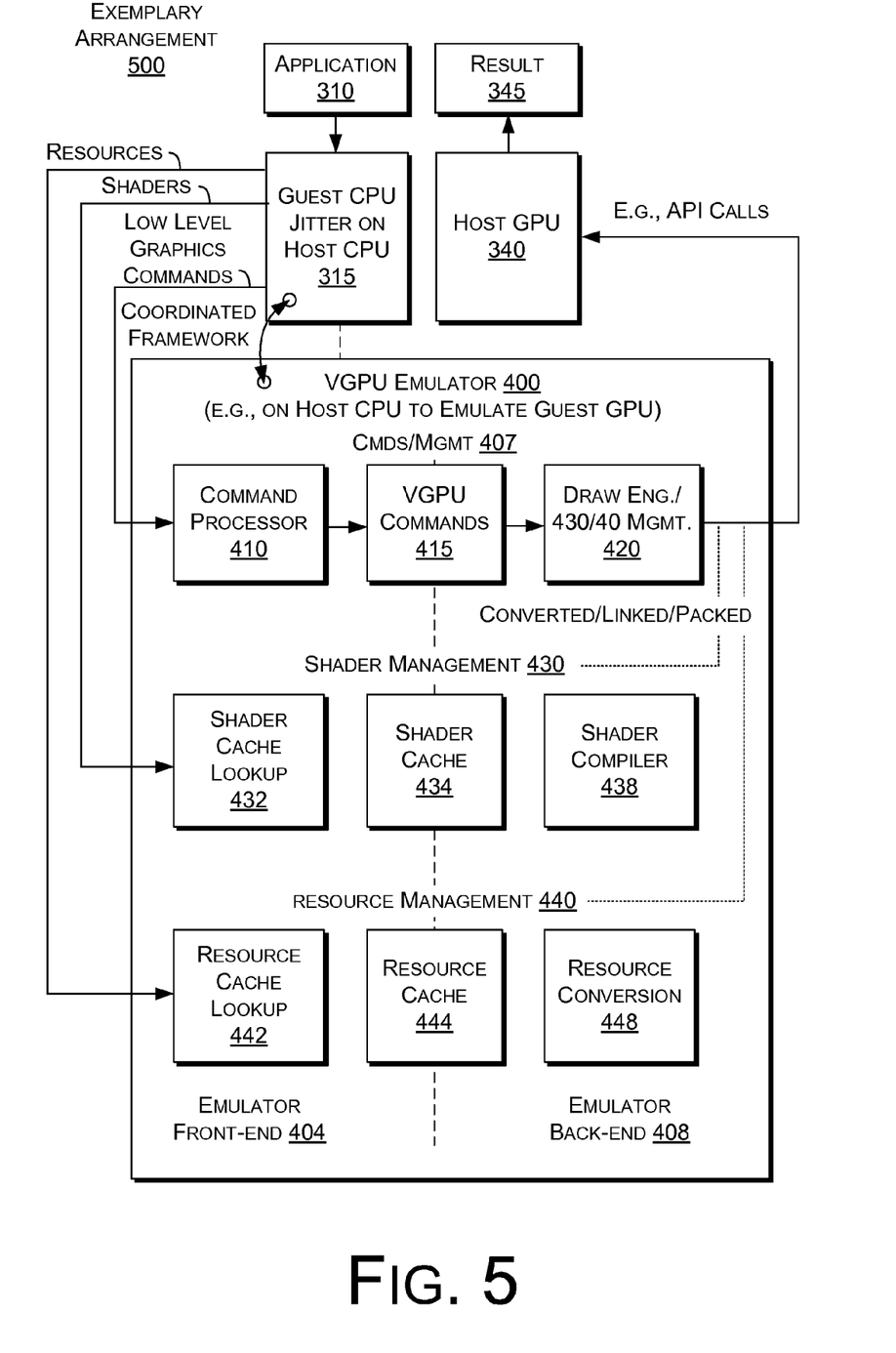
FIG. 5 is a block diagram of an exemplary process for emulating a target GPU using a VPGU such as the VGPU of FIG. 4.

FIG. 5 shows an exemplary arrangement 500 that illustrates information flow from an application 310 to a rendered result 345 via the VGPU 400 of FIG. 4, which is shown in more detail as including an emulator front-end 404 and an emulator back-end 408 along with a command/general management layer 407, a shader management layer 430 and a resource management layer 440 that span the front-end 404 and the back-end 408. The front-end 404 and back-end 408 configuration of the VGPU 400 enhances portability of the VGPU 400 across different host platforms and simplifies parallel implementation. As shown in the example of FIG. 5, the front-end 404 only relates to "guest" logic while the back-end relates to host logic. Further, the VGPU 400 may be considered as part of a framework together with a guest CPU jitter on the host CPU 315. The framework can operate in a coordinated manner to emulate the scenarios 180 of FIG. 1.

As shown in the example of FIG. 5, the command/general management layer 407 includes a command processor module 410 (front-end), a VGPU commands module 415 and a draw engine/shader/resource management module 420 (back-end); the shader management layer 430 includes a shader cache lookup module 432 (front-end), a shader cache 434 and a shader compiler 438 (back-end); and the resource management layer 440 includes a resource cache lookup module 442 (front-end), a resource cache 444 and a resource conversion module 448 (back-end).

To arrive at the rendered result 345, the guest CPU jitter on the host CPU 315 executes the application 310 and transmits low level graphics commands to a command buffer (see, e.g., the packed commands 130 of FIG. 1 and the commands of the GPU video memory 160 of FIG. 2). In this regard, the emulation framework, per the arrangement 500, handles the low level graphic commands as being directed to the VGPU 400 and not directly to a GPU (or to a conventional API abstraction layer of a GPU).

Once generated, the commands are received by the command processor 410 of the VGPU front-end 404 in the command/general management layer 407, for example, as being present in a command buffer (e.g., a buffer that may batch various commands). In turn, the command processor 410 parses the input command buffer and generates intermediate VGPU commands 415, which are independent of both the host system and the guest system. In other words, in the example of FIG. 5, the VGPU command processor 410 relies on an intermediate representation that can adequately represent the intent of input commands in a manner suitable for further processing, for example, by the draw engine 420, which is configured to output commands to the host GPU 340 (e.g., optionally via an API).

As indicated in FIG. 5, the guest CPU jitter 315 also generates shader related actions. These actions may be directly routed to the front-end 404 shader cache lookup module 432 in the shader management layer 430. In another manner, a shader cache lookup module 432 may receive calls from the command parser 410, for example, to determine if a shader or shaders are called for in producing the rendered result 345. If the command parser 410 calls for a shader cache lookup by the module 432 and a corresponding shader is not in the shader cache 434, then the front-end 404 of the VGPU 400 is responsible for accessing the shader or shader commands (e.g., optionally shader code) and transferring the shader or compiling the shader via the shader compiler 438 and placing the shader in the shader cache 434, which becomes accessible by the back-end 408 of the VGPU 400.

As indicated in FIG. 5, the guest CPU jitter 315 also generates resource related actions. These actions may be directly routed to the front-end 404 resource cache lookup module 442 in the resource management layer 440. In another manner, a resource cache lookup module 442 may receive calls from the command parser 410, for example, to determine if a resource or resources are called for in producing the rendered result 345. If the command parser 410 calls for a resource cache lookup by the module 442 and a corresponding resource (e.g., a texture) is not in the resource cache 444, then the front-end 404 of the VGPU 400 is responsible for accessing the resource or resource commands (e.g., optionally code) and transferring the resource or creating the resource, converting the resource via the resource conversion module 448, if required, and placing the resource in the resource cache 444, which becomes accessible by the back-end 408 of the VGPU 400.

In the VGPU 400, a dotted line between the shader management layer 430 and the draw engine/general management module 420 and a dotted line between the shader management layer 430 and the draw engine/general management module 420 indicate that the module 420 coordinates output of commands for rendering by the host GPU 340. Specifically, the module 420 at the back-end 408 receives VGPU commands (e.g., as in a command buffer) and generates host calls for the host GPU 340, which may be API calls for an interface that exposes functionality of the host GPU 340. The module 420 manages situations where a resource or a shader is not cached, for example, by invoking the resource conversion module 448 or the shader compiler 438 to create a new corresponding host resource or shader. Configured in such a manner, the VGPU allows for parallelization of VGPU tasks by utilizing multiple host CPU cores (see, e.g., cores 903 of the processing unit 902 of FIG. 9).

Figure 6:
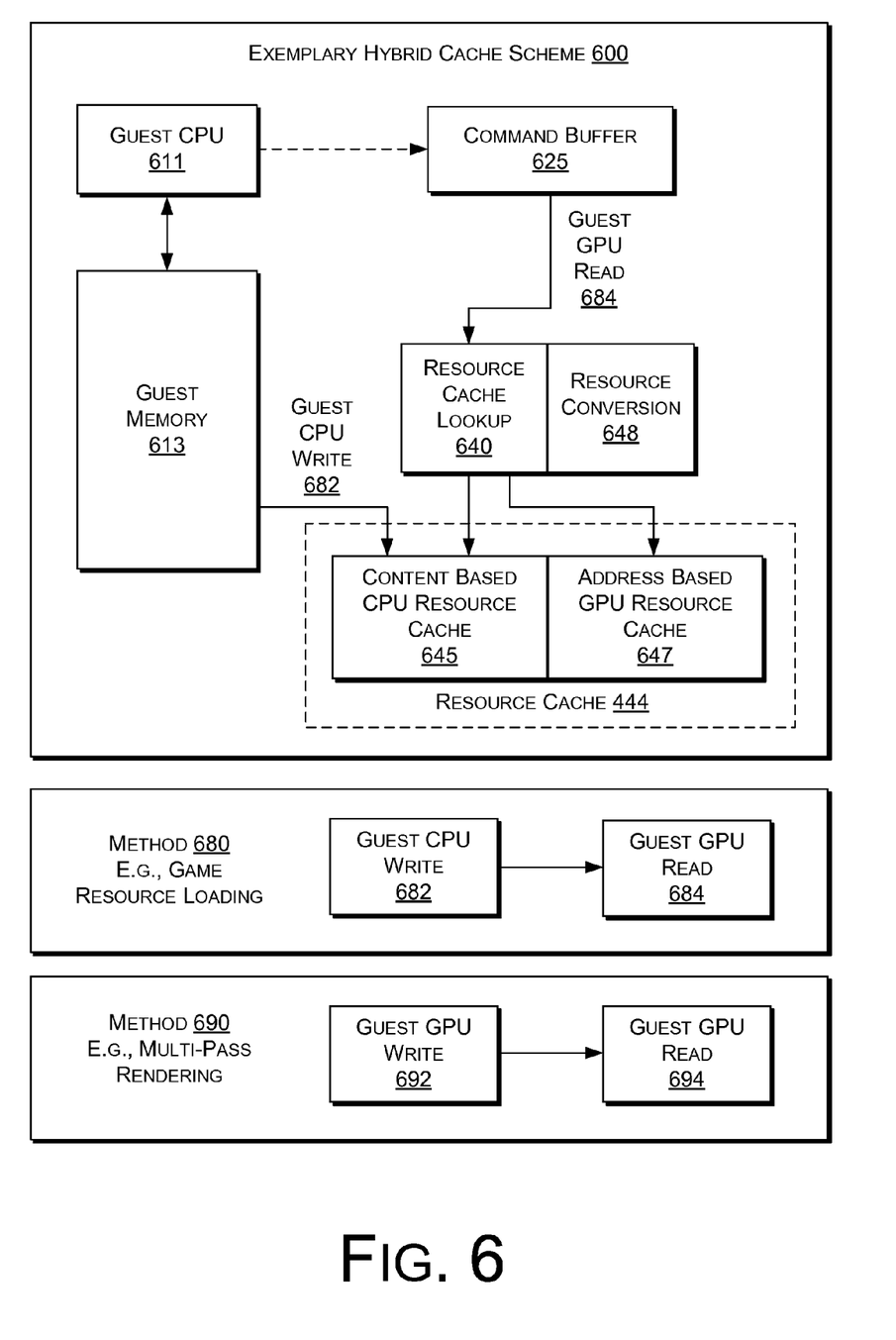
FIG. 6 is a block diagram of an exemplary hybrid cache scheme that allows for emulation of a target GPU in real time.

FIG. 6 shows an exemplary hybrid cache scheme 600 in association with a method 680 and a method 690. Rendering is a data intensive task, especially for 3D games where a GPU typically needs to read more than 100 MB data from memory to render each frame. High throughput makes run-time resource conversion and creation expensive and time consuming. However, resource monitoring demonstrates that for many 3D game resources, after they are used in one frame, they are often reused in several subsequent frames. Specifically, trials in resource monitoring for particular game content demonstrated that only about 10% of the resources for each frame are new resources. The hybrid resource caching scheme 600 accounts for such reuse in an effort to keep most reusable resources in cache, which, in turn, reduces resource manipulations.

As described herein with respect to FIG. 6, cache performance is considered as being important. For example, consider two typical cache scenarios: (a) guest CPU write, then guest GPU reads for game resource loading and (b) guest GPU write, then guest GPU read, which is common in multiple-pass rendering. For scenario (a), the method 680 includes a guest CPU write block 682 followed by a guest GPU read block while for scenario (b), the method 690 includes a guest GPU write block 692 followed by a guest GPU read block 694.

The scheme 600 includes a content based CPU resource cache 645 and an address based GPU resource cache 647. In the context of the method 680, a guest CPU 611 places information in guest memory 613, which is subsequently written, via write block 682, to the content based CPU resource cache 645 associated with a VGPU (e.g., the VGPU 400). The guest CPU 611 upon execution of code generates a command that is placed in a command buffer 625, which is accessible to the VGPU (i.e., the "guest" GPU). Upon a guest GPU read per block 684, the resource cache lookup module 640 initiates an appropriate lookup in the content based CPU resource cache 645 of the main resource cache 444 of the VGPU to access the content written per the guest CPU write block 682.

As mentioned, the cache scheme 600 includes a content based CPU resource cache 645 and an address based GPU resource cache 647. The content based cache 645 can cache resources generated by a guest CPU (e.g., from a DVD ROM, a hard disk or other memory) and rely on a content based method for cache lookup. The address based cache 647 caches resources as generated by a GPU, for example a frame buffer rendered by a GPU or some other buffer that is used by a GPU (e.g., a compute buffer), where the GPU relies on address for lookup. For example, a GPU can track a cached resource based on its address and the scheme 600 can ensure that an address range in memory is maintained (or otherwise monitored) to allow for addressed based cache access. In general, for a CPU, data integrity in memory is important and for applications that stream, it is possible to move a graphics resource into memory and then feed the graphics resource to the content based cache 645.

In the hybrid cache scheme 600, a content based cache 645 can be used to store VB, IB, and texture resources and implemented, for example, according to the method 680 where a CPU write occurs in block 682 and a GPU read occurs in block 684. For the example of FIG. 6, the resource key storage is reduced and lookup speed improved.

With respect to the address based cache 647, it may be used for resources generated by the GPU side, such as render to texture. The Least Recently Used (LRU) algorithm can be used to retire the cache content when the cache is full. The LRU aims to discard the least recently used items first, which typically correspond to resources of a frame for a scene not currently being rendered. The LRU algorithm can track what resources were used, for example, with respect to time and successively discard the least recently used resource. The LRU algorithm may keep "age bits" for cache-lines and track the "Least Recently Used" cache-line based on age-bits. As described herein, a cache may be shared by multiple threads. Hence, a resource cache may be feed by one thread and read by another thread (e.g., shared by a front-end process and a back-end process). Such an approach further allows a host GPU to access resources (e.g., VGPU cache to host GPU cache) in an efficient manner, which facilitates emulation of a GPU in real time.

With respect to gaming, the hybrid scheme 600 in combination with an exemplary VGPU can facilitate emulation of legacy GPU behavior on a newer gaming platform. Such an approach takes advantage of scene behavior with respect to resource caching, which facilitates real time GPU emulation.

As described herein, an exemplary method for caching resources associated with a graphics application during emulation of a graphics processing unit (GPU) on a host computing system includes establishing a content based resource cache in memory of the host computing system; establishing an address based resource cache in memory of the host computing system; upon execution of the graphics application by a CPU of the host computing system, writing a graphics resource to the content based cache based on a CPU instruction issued by the CPU of the host computing system; and upon rendering of graphics by a GPU of the host computing system, based at least in part on execution of the graphics application, reading a graphics resource from the address based cache based on a GPU instruction issued by the GPU of the host computing system. Such a method may further include writing a graphics resource generated by the GPU of the host computing system to the address based cache where the writing a graphics resource generated by the GPU may be part of a multi-pass rendering process.

An exemplary method can include writing a graphics resource to a content based cache based on a CPU instruction issued by the CPU of the host computing system that includes writing a graphics resource from a storage medium accessible by the host computing system. For example, the storage medium may be a removable storage medium (e.g., DVD, portable drive, etc.) or a remote storage medium accessed via a network. In a particular example, a storage medium includes graphics resources for a game and writing pertains to game loading.

Figure 7:
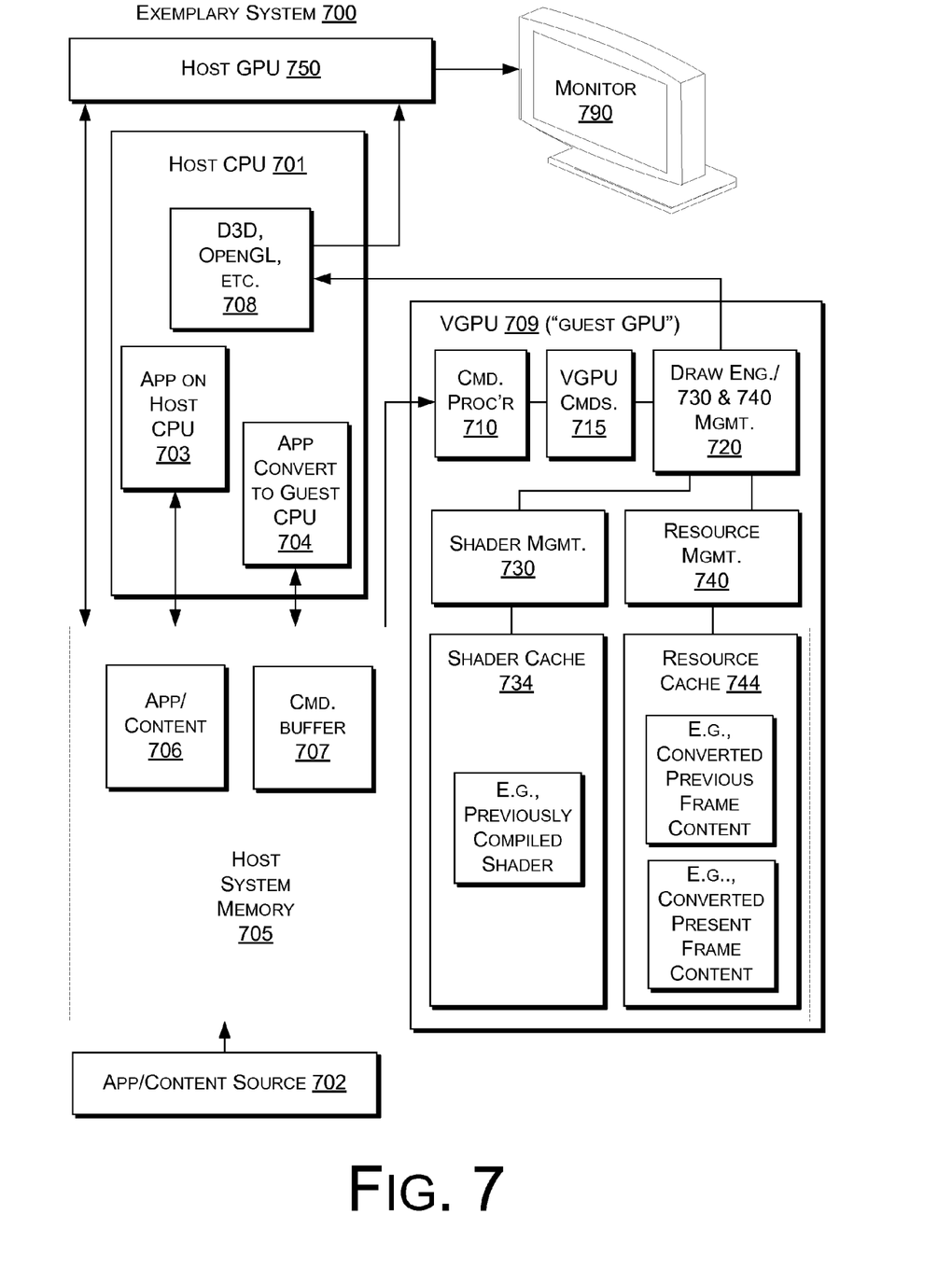
FIG. 7 is a block diagram of an exemplary process for testing an application using a VGPU such as the VGPU of FIGS. 4 and 5.

FIG. 7 shows an exemplary system 700 that includes a host CPU 701, host system memory 705, a VGPU (guest GPU) 709, a host GPU 750 and a monitor 790. An application or content source 702 is shown as being directed to the host system memory 705, for example, via direction from the host CPU 701. The host CPU 701 includes an application block 703 that represents an application executing on the host CPU 701 and an application execution conversion block 704 that represents an application executing on, for example, a jitter, which in turn executes on the host CPU 701. The host CPU 701 also optionally executes a framework 708 that exposes or coordinates action of the host GPU 750. As mentioned, such a framework may be the Direct3D® framework that can expose advanced graphics capabilities of 3D graphics hardware such as z-buffering, anti-aliasing, alpha blending, mip-mapping, atmospheric effects, and perspective-correct texture mapping.

The host system memory 705 provides memory for storage of application code and/or content 706 and memory for commands as in a command buffer 707. The host system memory 705 is accessible by the host CPU 701 and the VGPU 709. Further, upon invocation, the VGPU 709 establishes memory resources such as the shader cache 734 and the resource cache 744 in the host system memory 705. Not explicitly shown in FIG. 7 is memory of the host GPU 750, which may be memory such as that of the GPU 150 of FIG. 1 (e.g., video memory and caches).

In a particular rendering process, the VGPU 709 may receive commands via the command processor 710, generate intermediate VGPU commands 715 and perform shader management 730 and resource management 740 operations via a draw engine and general management module 720 to output commands to the API framework 708, which, in turn, instruct the host GPU 750 to render a result to a monitor 790.

As mentioned, the shader cache 734 may store a previously used shader and the resource cache 744 may store previously used and converted frame content and presently converted frame content. Where a particular shader or shaders are used repeatedly as content is rendered, the shader cache 734 facilitates real time GPU emulation by the VGPU 709. Similarly, where a particular resource or resources are used repeatedly as content is rendered, the resource cache 744 facilitates real time GPU emulation by the VGPU 709.

Figure 8:
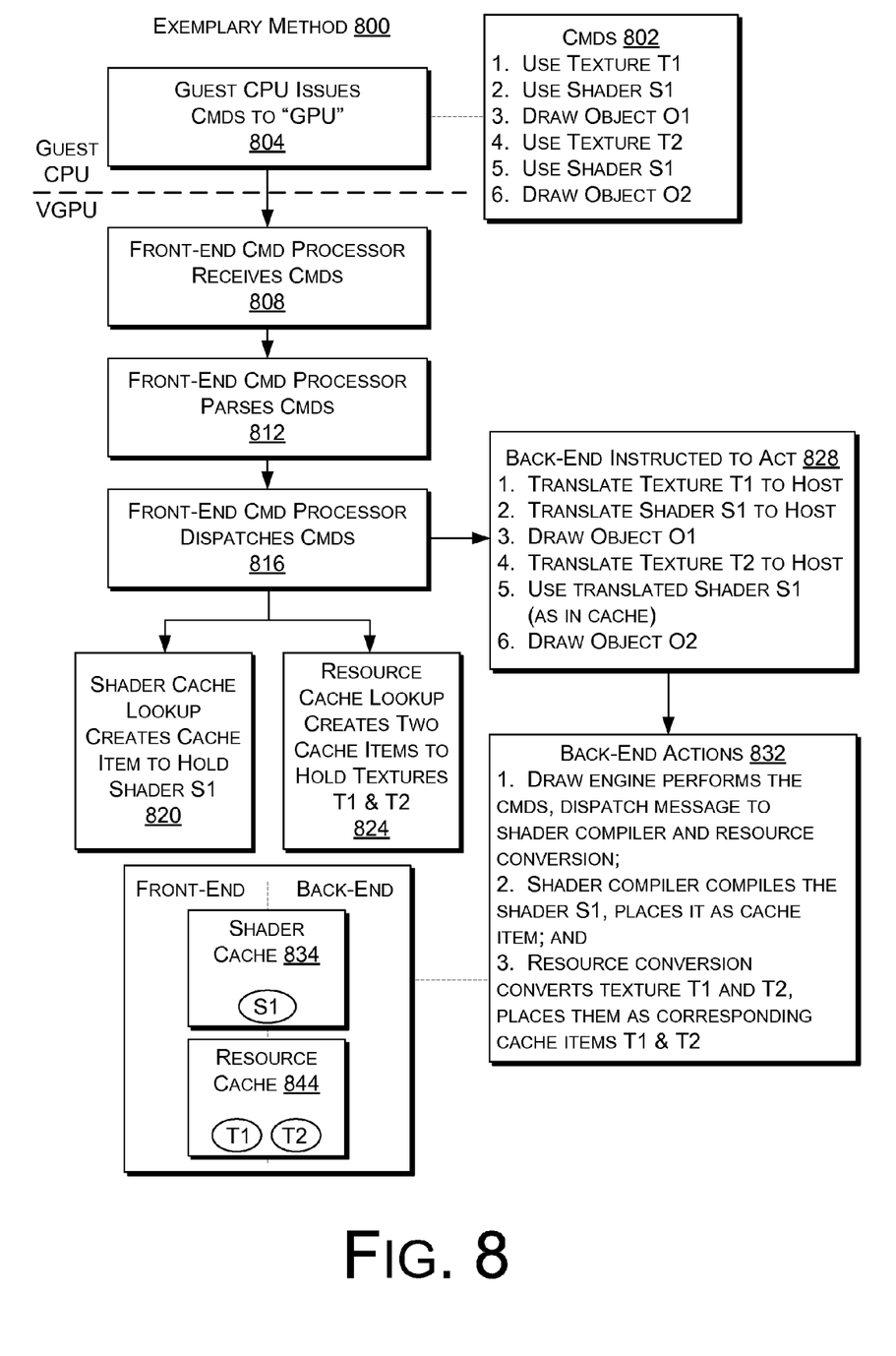
FIG. 8 is a block diagram of an exemplary method that implements the VGPU of FIGS. 4 and 5.

FIG. 8 shows an exemplary method 800 that implements a VGPU such as the VGPU 400 of FIGS. 4 and 5. FIG. 8 includes a dashed horizontal line to indicate a distinction between graphical actions of the CPU with respect to commands issued by an application, whether host or guest, and actions by the VGPU to emulate a GPU.

In an issue block 804, the guest CPU issues the following commands (e.g., low level graphics commands) to a target GPU: Use Texture T1, Use Shader S1, Draw Object O1, Use Texture T2, Use Shader S1, and Draw Object O2. In a reception block 808, the VGPU front-end command processor receives the commands as issued by the guest CPU. In a parse block 812, the command processor of the front-end of the VGPU parses the received commands.

Once parsed, in a dispatch block 816, the command processor dispatches the commands to the appropriate modules of the VGPU or otherwise initiates appropriate action to handle the commands. In the example of FIG. 8, command processor dispatches commands to a shader cache module block 820 and a resource cache lookup block 824 of the front-end of the VGPU. In response, the shader cache lookup block 824 creates a cache item to hold shader S1 and the resource cache lookup block 828 creates two cache items to hold texture T1 and texture T2.

The front-end command process also generates the following VGPU commands for the back-end of the VGPU: Translate Texture T1 to Host, Translate Shader S1 to Host, Draw Object O1, Translate Texture T2 to Host, Use translated Shader S1 (as in cache per block 824), and Draw Object O2. In an instruction block 828, the back-end receives the VGPU commands. In turn, a back-end action block 832 acts such that the draw engine performs the commands, dispatchs a message to the shader compiler and the resource conversion module; the shader compiler compiles the shader S1 and places it into the shader cache as a cache item; and the resource conversion module converts the texture T1 and the texture T2 and places them into the resource cache as appropriate corresponding cache items. Hence, according to the method 800, the shader S1 is now in the shader cache 834 and the textures T1 and T2 are now in the resource cache 844.

If future commands issued by the guest CPU and received by the VGPU call for shader S1, texture T1 or texture T2, the VGPU can reuse the items in the shader cache 834 and/or the resource cache 844, unless one or both caches have been purged due to operational constraints.

As already mentioned, the draw engine of the back-end of the VGPU issues commands to appropriately cause a host GPU to render the graphics per instructions of a graphics application. In various examples, the Direct3D® API framework is mentioned as an abstraction layer that exposes functionality of the host GPU; noting that other techniques may be used.

As described herein, an exemplary method for emulating a GPU (e.g., target or guest GPU) includes executing a graphics application on a host computing system to generate commands for a target GPU where the host computing system includes host system memory and a different, host GPU; converting the generated commands into intermediate commands (e.g., the intermediate commands intermediate the generated commands for the target GPU and commands for the host GPU); based on one or more generated commands that call for one or more shaders, caching one or more corresponding shaders in a shader cache in the host system memory; based on one or more generated commands that call for one or more resources, caching one or more corresponding resources in a resource cache in the host system memory; based on the intermediate commands, outputting commands for the host GPU (e.g., directly or to an interface that exposes functionality of the host GPU); and, based on the output commands for the host GPU, rendering graphics using the host GPU where output commands that call for one or more shaders access the one or more corresponding shaders in the shader cache and where output commands that call for one or more resources access the one or more corresponding resources in the resource cache. The foregoing method may rely on one or more processor-readable media that include processor-executable instructions for performing the converting, the cachings and the outputting. In such a method, the host computing system can include multiple processing cores configured to execute tasks of the method in parallel (e.g., two cores, with one directed primarily to front-end tasks such as CPU tasks and another directed primarily to back-end tasks such as GPU tasks).

In such a method, the one or more corresponding shaders can be converted shaders, converted for compatibility with the host GPU and the one or more corresponding resources can be converted resources, converted for compatibility with the host GPU.

As mentioned, a resource cache can include a content based resource cache and an address based resource cache where the content based cache caches a resource or resources based on a write command from a CPU, for example, for later access by a read command from a GPU and where the address based cache caches a resource or resources accessible by a read command from a GPU, for example, where the cached resource or resources were previously cached based on a write command from the GPU. While various caches are described with respect to a general host system memory architecture, other types of memory architectures may be suitable. For example, a custom architecture may account for CPU and GPU specifics to achieve greater performance (e.g., especially where a computing device includes multiple processor cores/CPUs, multiple GPUs or multiple cores/CPUs and multiple GPUs). Various techniques may also be applied entirely with CPU-based GPU emulation (e.g., where a computing device does not include a GPU). In such circumstances, memory architecture and caches may be structured to account for the lack of a "real" GPU.

As mentioned, a resource cache can cache one or more resources used to render a previous frame of graphics to expedite rendering a present frame of graphics.

As mentioned, execution of a graphics application may rely on a jitter, for example, where the jitter emulates a target CPU and where a host computing system includes a different, host CPU.

As described with respect to FIG. 8, in an exemplary method, generated commands can include a shader command, a texture command and a draw object command, where rendering renders an object using a host GPU responsive to a converted shader command, a converted texture command and a converted draw object command that renders the object, in part, by accessing a corresponding shader in a shader cache and by accessing a corresponding resources in a resource cache.

As described herein, an exemplary system for emulating execution of a graphics application on a target GPU includes one or more processors; memory; a host GPU; control logic to convert commands generated by execution of the graphics application to commands to instruct the host GPU to render graphics of the graphics application; control logic to convert a shader associated with a graphics application to a converted shader compatible with the host GPU; control logic to cache one or more converted shaders in a shader cache established in the memory and accessible to the host GPU; control logic to convert a resource associated with a graphics application to a converted resource compatible with the host GPU; and control logic to cache one or more converted resources in a resource cache established in the memory and accessible to the host GPU. Such a system may further include control logic to emulate a target processor using the one or more processors. Control logic may be in the form of processor-executable instructions and optionally stored on a storage medium accessible and readable by a computing device (e.g., computer, game unit, etc.).

Figure 9:
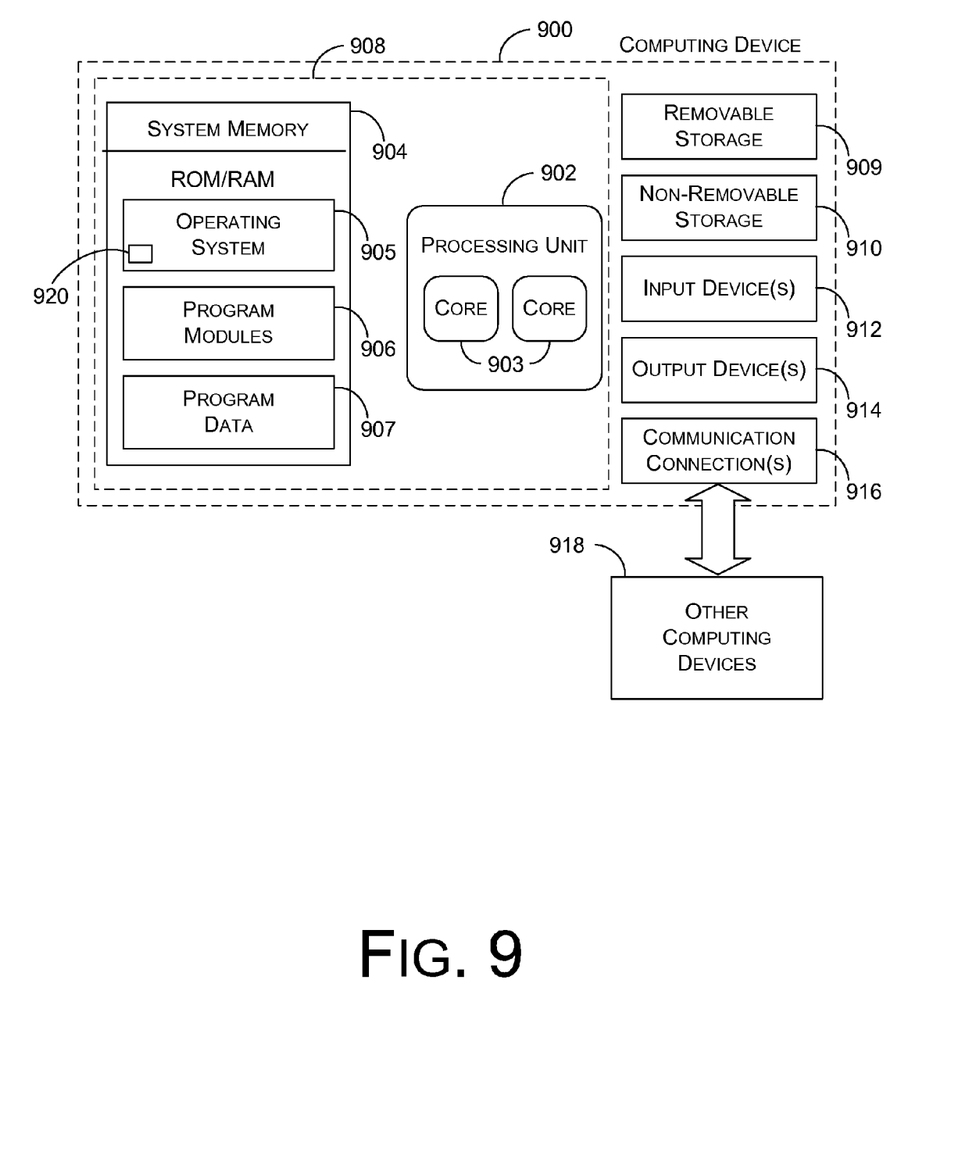
FIG. 9 is a block diagram of an exemplary computing device.

FIG. 9 illustrates an exemplary computing device 900 that may be used to implement various exemplary components and in forming an exemplary system for emulating a GPU (see, e.g., the scenarios 180 of FIG. 1).

In a very basic configuration, computing device 900 typically includes at least one processing unit 902 and system memory 904. As indicated, the processing unit 902 may include multiple cores 903. As explained, an exemplary VGPU may execute processes in parallel to facilitate GPU emulation. Such parallel processing may rely on two or more cores. Various trials demonstrated that two cores could execute tasks in parallel to allow for real time emulation of a GPU. Depending on the exact configuration and type of computing device, system memory 904 may be volatile (such as RAM), non-volatile (such as ROM, flash memory, etc.) or some combination of the two. System memory 904 typically includes an operating system 905, one or more program modules 906, and may include program data 907. The operating system 905 include a component-based framework 920 that supports components (including properties and events), objects, inheritance, polymorphism, reflection, and provides an object-oriented component-based application programming interface (API), such as that of the .NET™ Framework marketed by Microsoft Corporation, Redmond, Wash. The device 900 is of a very basic configuration demarcated by a dashed line 908. Again, a terminal may have fewer components but will interact with a computing device that may have such a basic configuration.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well know in the art and need not be discussed at length here. An output device 914 may be a graphics card or graphical processing unit (GPU). In an alternative arrangement, the processing unit 902 may include an "on-board" GPU. In general, a GPU can be used in a relatively independent manner to a computing device's CPU. For example, a CPU may execute a gaming application where rendering visual scenes occurs via a GPU without any significant involvement of the CPU in the rendering process. Examples of GPUs include but are not limited to the Radeon® HD 3000 series and Radeon® HD 4000 series from ATI (AMD, Inc., Sunnyvale, Calif.) and the Chrome 430/440GT GPUs from S3 Graphics Co., Ltd (Freemont, Calif.). As described herein, a computing device may include multiple GPUs where an exemplary method relies on one or more of these GPUs. Further, one or more of such GPUs may be on-board (e.g., one-to-one correspondence with the number of CPUs or cores), independent or a combination of on-board and independent.

Computing device 900 may also contain communication connections 916 that allow the device to communicate with other computing devices 918, such as over a network. Communication connections 916 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for emulating a graphics processing unit (GPU), the method comprising:
   executing a graphics application on a host computing system to generate commands for a target GPU, wherein the host computing system comprises host system memory, a host central processing unit (CPU), and a host GPU;
   converting the generated commands into intermediate commands at a command processor of a virtual GPU emulator, the virtual GPU emulator emulates the target GPU through communication with the host GPU and the host CPU, the intermediate commands providing calls to a shader manager and a resource manager of the virtual GPU emulator;
   based on one or more calls to the shader manager that call for one or more shaders, caching one or more corresponding shaders in a shader cache in the host system memory;
   based on one or more calls to the resource manager that call for one or more resources, caching one or more corresponding resources in a resource cache in the host system memory;
   based on the intermediate commands, generating output commands for the host GPU; and
   based on the output commands for the host GPU, rendering graphics using the host GPU, wherein a first group of output commands that call for one or more shaders access the one or more corresponding shaders in the shader cache, and wherein a second group of output commands that call for one or more resources access the one or more corresponding resources in the resource cache.

2. The method of claim 1, wherein the output commands for the host GPU comprise commands associated with an application programming interface that exposes functionality of the host GPU.

3. The method of claim 1, wherein the one or more corresponding shaders comprise converted shaders that are converted for compatibility with the host GPU.

4. The method of claim 1, wherein the one or more corresponding resources comprise converted resources that are converted for compatibility with the host GPU.

5. The method of claim 1, wherein the resource cache comprises a content based resource cache and an address based resource cache.

6. The method of claim 5, wherein the content based cache caches one or more resources based on a write command from the host CPU, and wherein the one or more cached resources are accessible based on a read command from the host GPU.

7. The method of claim 5, wherein the address based cache caches one or more resources based on a write command from the host GPU, and wherein the one or more cached resources are accessible based on a read command from the host GPU.

8. The method of claim 1, wherein the host computing system comprises multiple processing cores configured to execute tasks in parallel.

9. The method of claim 1, wherein the shader cache caches one or more compiled shaders.

10. The method of claim 1, wherein the resource cache caches one or more resources used to render a previous frame of graphics to expedite rendering a present frame of graphics.

11. The method of claim 1, wherein the executing comprises executing the graphics application on a jitter.

12. The method of claim 11, wherein the jitter emulates a target CPU.

13. The method of claim 1, wherein the generated commands comprise a shader command, a texture command, and a draw object command, wherein the rendering renders the object using the host GPU responsive to a converted shader command, a converted texture command, and a converted draw object command that renders the object, in part, by accessing one of the one or more corresponding shaders in the shader cache and by accessing one of the one or more corresponding resources in the resource cache.

14. One or more processor-readable memory comprising processor-executable instructions for performing the converting, the caching of the one or more corresponding shaders, the caching of the one or more corresponding resources, and the outputting of the method of claim 1.

15. A method for caching resources associated with a graphics application during emulation of a target graphics processing unit (GPU) on a host computing system, the method comprising:
  establishing a content based resource cache in memory of the host computing system;
  establishing an address based resource cache for the target GPU in the memory of the host computing system, the address based resource cache including a frame buffer;
  upon execution of the graphics application by a CPU of the host computing system, writing a graphics resource generated by a host GPU of the host computing system to the content based cache in response to a CPU instruction issued by the CPU of the host computing system, the writing the graphics resource generated by the host GPU being a part of a multi-pass rendering process; and
  upon rendering of graphics by the host GPU of the host computing system based at least in part on execution of the graphics application, reading a graphics resource from the address based resource cache that includes the frame buffer in response to a GPU instruction issued by the host GPU of the host computing system.

16. The method of claim 15, further comprising writing the graphics resource generated by the host GPU of the host computing system to the address based resource cache.

17. The method of claim 15, wherein the writing the graphics resource to the content based cache in response to the CPU instruction issued by the CPU of the host computing system comprises writing the graphics resource from a storage medium accessible by the host computing system.

18. The method of claim 17, wherein the storage medium comprises a removable storage medium.

19. The method of claim 17, wherein the storage medium comprises graphics resources for a game and wherein the writing pertains to game loading.

20. A system for emulating execution of a graphics application on a target graphics processing unit (GPU), the system comprising:
  one or more host central processing units (CPUs) to execute control logics;
  memory;
  a host graphics processing unit (GPU);
  control logic that converts commands generated by execution of the graphics application to intermediate commands that instruct the host GPU to emulate a target GPU during rendering of graphics of the graphics application, the intermediate command providing calls to a shader management control logic and a resource management control logic of the target GPU;
  control logic that converts a shader associated with the graphics application to a converted shader compatible with the host GPU under direction of the shader management control logic;
  control logic that caches one or more converted shaders in a shader cache established in the memory and accessible to the host GPU under direction of the resource management control logic;
  control logic that converts a resource associated with the graphics application to a converted resource compatible with the host GPU under direction of the resource management control logic; and
  control logic that caches one or more converted resources in a resource cache established in the memory and accessible to the host GPU.

21. The system of claim 20, further comprising control logic that retrieves the one or more converted shaders from the shader cache or the one or more converted resources from the resource cache.

22. The system of claim 20, wherein the host GPU emulates the target GPU at a binary level based on the intermediate commands.

* * * * *